(12) United States Patent
Goto

(10) Patent No.: US 6,459,535 B1
(45) Date of Patent: Oct. 1, 2002

(54) ZOOM LENS SYSTEM AND IMAGE PICKUP APPARATUS USING SAME

(75) Inventor: Hisashi Goto, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 85 days.

(21) Appl. No.: 09/624,606

(22) Filed: Jul. 25, 2000

(30) Foreign Application Priority Data

Jul. 26, 1999 (JP) .......................................... 11-210216

(51) Int. Cl.⁷ .............................................. G02B 15/14
(52) U.S. Cl. ...................... 359/666; 359/676; 359/683; 359/689; 359/692
(58) Field of Search .................. 359/676, 683, 359/666, 667, 692, 689

(56) References Cited

U.S. PATENT DOCUMENTS

| | | | |
|---|---|---|---|
| 4,407,567 A | * 10/1983 | Michelet et al. | ............ 359/666 |
| 4,784,479 A | * 11/1988 | Ikemori | ...................... 359/666 |
| 4,871,240 A | * 10/1989 | Suda | ........................... 359/683 |

FOREIGN PATENT DOCUMENTS

| | | |
|---|---|---|
| JP | 60-254014 | 12/1985 |
| JP | 61-284719 | 12/1986 |
| JP | 63-179309 | 7/1988 |
| JP | 63-208818 | 8/1988 |
| JP | 7-49409 | 2/1995 |
| JP | 7-151908 | 6/1995 |
| JP | 10-48597 | 2/1998 |
| JP | 10-73758 | 3/1998 |

OTHER PUBLICATIONS

Patent Abstract of Japan: Komura, et al: Lens With Variable Focal Point, JP–7–49404, Feb. 21, 1995.

* cited by examiner

Primary Examiner—Scott J. Sugarman
(74) Attorney, Agent, or Firm—Pillsbury Winthrop LLP

(57) ABSTRACT

A compact zoom lens system having a high vari-focal ratio comprising at least two lens units in which the lens units are moved in loci different from each other to change a magnification and a refractive power variable optical element is used in the lens unit.

24 Claims, 8 Drawing Sheets

ZOOM LENS SYSTEM AND IMAGE PICKUP APPARATUS USING SAME

BACKGROUND OF THE INVENTION

1. Field of the Invention

The present invention relates to a zoom lens system and an image pickup apparatus which is equipped with the zoom lens system.

2. Description of the Prior Art

It is required for a zoom photographic optical system and a zoom finder optical system of a silver salt camera and a digital camera to have a compact design and a high vari-focal ratio. These two requirements are contrary to each other and must be balanced in a high dimension in particular.

Used conventionally as zoom photographic optical systems are a zoom lens system which is configured as a collapsible mount type so as to have a short total length at a portative time and a zoom lens system which is composed of two positive lens unit and negative lens unit or three positive lens unit, positive lens unit and negative lens unit so as to have a short total length at a wide position and a tele position.

However, the zoom lens system including the collapsible mount type moves a lens unit (zooming lens unit) for a long distance for zooming, thereby having defects that the lens system not only has a large total length but also complicates a lens barrel structure and enlarges a camera as a whole.

Furthermore, the lens system finally has a large total length to reserve a distance for moving the zooming lens unit. In order to shorten a moving distance of the zooming lens unit reversely and enhance a vari-focal ratio, a focusing mechanism or the like requires remarkably delicate precision, thereby enlarging influences on a cost, performance and so on.

Furthermore, there is known a zoom photographic optical system which is configured to reduce a number of lens units to be moved for zooming and the like using a refractive power variable optical element and share an image surface correcting function with this optical element.

This refractive power variable optical element is an element which changes a refractive index of a liquid crystal or an element which changes a shape. As concrete examples of this refractive power variable optical element, there are known elements disclosed by Japanese Patent Kokai Publications No. Hei 7-151908 and No. 7-49404. These elements are elements which change refractive power by changing shapes of lenses with ressures or the like. Furthermore, known as other refractive power variable optical elements are elements disclosed by Japanese Patent Kokai Publications No. Hei 10-48597 and No. Hei 10-73758. These elements are elements using a liquid crystal or the like which changes a refractive index of a medium with an electrical function and application of the elements to optical systems are described in the publications.

As conventional examples in which focusing functions of photographic optical systems are shared using these refractive power variable optical elements, there are known optical system disclosed by Japanese Patent Kokai Publications No. Sho 60-254014 and No. Sho 63-179309. These optical systems are configured to correct changes of image surfaces caused by zooming with refractive power variable optical elements such as those described above.

As a conventional example of zoom photographic optical system which uses a refractive power variable optical element, an optical system disclosed by Japanese Patent Kokai Publication No. Sho 63-208818 uses a refractive power variable optical element, thereby performing zooming without changing airspaces between a plurality of zooming lens units.

Furthermore, an optical system disclosed by Japanese Patent Kokai Publication No. Sho 61-284719 is known as an optical system which performs focusing using a refractive power variable optical element.

The above described conventional examples of optical system using the refractive power variable optical elements have a defect that changes of refractive power of the optical elements themselves is small.

Furthermore, the above described conventional examples are insufficient as optical systems which are compact and have high vari focal ratios.

SUMMARY OF THE INVENTION

An object of the present invention is to provide a zoom lens system comprising at least two lens units and configured to change a magnification by moving the lens units in different loci, wherein a refractive power variable optical element is disposed in each lens unit.

Another object of the present invention is to provide a zoom lens system comprising at least two lens units and configured to change a magnification from a wide position to a tele position by moving the lens units so as to have different loci, wherein at least one lens unit out of the lens units has a refractive power variable optical element and the lens unit satisfies the following condition (1):

$$\phi V(T) < \phi V(W) \tag{1}$$

Furthermore, another object of the present invention is to provide a zoom lens system comprising at least two lens units and configured to change a magnification from a wide position to a tele position by moving the respective lens units in different loci, wherein at least a lens unit out of moving lens units has an optical element variable in a front principal point location, the zoom lens system has a lens unit disposed on the object side of the lens unit which has the optical element and satisfies the following condition (2):

$$(DF(W) - DF(T))/(HF(W) - HF(T)) > 0 \tag{2}$$

Furthermore, still another object of the present invention is to provide a zoom lens system comprising at least a focusing lens unit which is moved for focusing out of lens units, using at least one refractive power variable optical element in the focusing lens unit or a lens unit located on the object side of the focusing lens unit and having a negative product of $(\beta R(W) - \beta R(T))$ multiplied by $(\phi V(W) - \phi V(T))$, that is, satisfying the following condition (4):

$$(\beta R(W) - \beta R(T))(\phi V(W) - \phi V(T)) < 0 \tag{4}$$

Further another object of the present invention is to provide a zoom lens system comprising at least two lens units and configured to change a magnification from wide position to a tele position by moving these lens units in different loci respectively, characterized in that at least a lens unit of the above described lens units has an optical element variable in a rear principal point location, and that the zoom lens system has another lens unit on the image side of the lens unit having the optical element variable in the rear principal point and satisfies the following condition (3):

$$(DR(W) - DR(T))/(HR(W) - HR(T)) < 0 \tag{3}$$

DETAILED DESCRIPTION OF THE PREFERRED EMBODIMENTS

Figure 1:
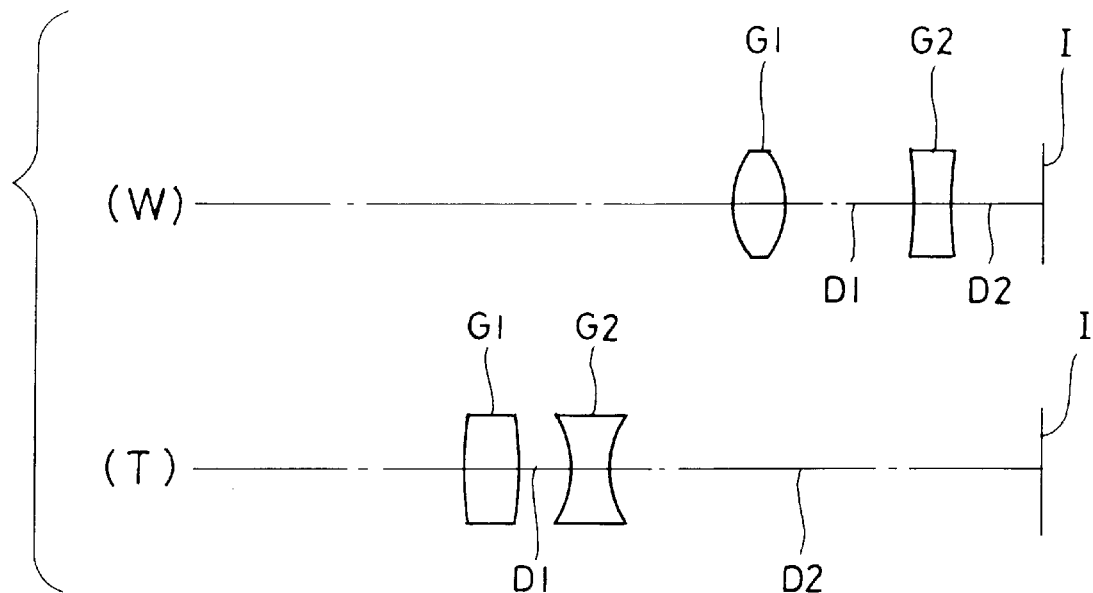
FIG. 1 is a diagram showing a composition of a first embodiment of the zoom lens system according to the present invention.

A zoom lens system according to the present invention is a lens system which comprises at least two lens units, is configured to change a magnification by moving the lens units in different loci and uses a refractive power variable optical element having in each lens unit.

The zoom lens system according to the present invention is capable of performing correction of a location of an image surface together with a change of magnification and correction of an image surface by moving at least two lens units in different loci as described above, moves the lens units for short distances to change the magnification and nevertheless has a high vari-focal ratio while changing refractive power of the refractive power variable optical elements disposed in these lens units.

That is, the zoom lens system according to the present invention moves the lens units for the short distances to change the magnification, whereby the lens system can be configured compact and have a high vari-focal ratio.

Furthermore, the zoom lens system according to the present invention can be configured as a zoom lens system having a vari-focal ratio extremely higher than that of a conventional zoom lens system which moves lens units for the same distances to change a magnification. Furthermore, the zoom lens system according to the present invention which moves the lens units for the short distances facilitates to compose a barrel mechanism and reserve a required barrel diameter and a required mount collapsing distance.

A zoom lens system according to the present invention which has a second composition is a lens system comprising at least two lens units and configured to change a magnification from a wide position to a tele position by moving the lens units so as to have different loci, wherein at least one lens unit out of the lens units has a refractive power variable optical element and satisfies the following condition (1):

$$\phi V(T) < \phi V(W) \quad \quad 1)$$

wherein a reference symbol $\phi V(T)$ represents refractive power (an inverse number of a focal length) of the lens unit which has the refractive power variable optical element at the tele position and a reference symbol $\phi V(W)$ designates refractive power (an inverse number of a focal length) of the lens unit which has the refractive power variable optical element at the wide position. In addition, $\phi V$ has a dimension of $mm^{-1}$.

The zoom lens system according to the present invention which has the second composition is configured to change a magnification of the lens system as a whole by changing an airspace between at least two lens units and maintain an image surface constant by moving these lens unit in different loci. Furthermore, at least the lens unit which has the optical element which has the refractive power variable optical element is configured to satisfy the condition (1) for further enhancing a vari-focal ratio. In other words, it is possible to enhance a vari-focal ratio by changing refractive power of the lens unit having the refractive power variable optical element in a negative direction to change the magnification from the wide position to the tele position. Furthermore, such a change of the refractive power makes it possible to reduce a change of an airspace between the lens units at an identical vari-focal ratio, thereby configuring the lens system more compact.

Speaking concretely, it is preferable to use a refractive power variable optical element having positive refractive power which is changed so that the positive power is weaker at the tele position than that at the wide position, a refractive power variable optical element having negative refractive power which is changed so that the negative power is stronger at the tele position than that at the wide position or a refractive power variable optical element which has positive refractive power at the wide position and negative refractive power at the tele position.

In case where $\phi V(T) = \phi V(W)$ in the condition (1), it is also possible to obtain an effect of enhancing a vari-focal ratio or reducing a change of an airspace between the lens units at an identical vari-focal ratio. However, a more remarkable effect can be obtained when the condition (1) is satisfied.

Furthermore, a zoom lens system according to the present invention which has a third composition is a lens system comprising at least two lens units and configured to change a magnification from a wide position to a tele position by moving the respective lens units in different loci, wherein at least one lens out of the moved lens units has an optical element variable in a front principal point location, and the lens system has a lens unit on the object side of the above described lens unit which has the optical element and satisfies the following condition (2):

$$(DF(W)-DF(T))/(HF(W)-HF(T))>0 \quad (2)$$

wherein reference symbols DF(W) and DF(T) represent airspaces between the lens unit which has the optical element variable in the front principal point location and the lens unit disposed on the object side of the above described lens unit which has the optical element at the wide position and the tele position respectively, and reference symbols HF(W) and HF(T) designate front principal point locations of the lens unit which has the optical element variable in the front principal point location at the wide position and the tele position respectively.

The front principal point location is defined herein as a distance as measured from a front lens surface of the lens unit (object side lens surface of the lens unit) to a front principal point of the lens unit.

The zoom lens system according to the present invention is a zoom lens system configured to change a focal length of the zoom lens system by varying an airspace between at least the two lens units and maintain an image surface constant by moving the two lens units in the different loci as described above, wherein at least one lens unit has the optical element variable in the front principal point location, and a lens unit disposed between the lens unit which has the optical element and a lens unit disposed on the object side is configured to satisfy the above mentioned condition (2) to enhance a vari-focal ratio. When the condition (2) is satisfied, the principal point location is changed for a long distance to change the magnification from the wide position to the tele position relative to a change of the airspace between the lens unit which includes the optical element variable in the front principal point location and the lens unit which is disposed on the object side of the lens unit, whereby a vari-focal ratio is enhanced relative to a moving distance.

A lens system which satisfies the condition (2) can be configured compact and have a high vari-focal ratio as described above.

In the zoom lens system according to the present invention which has the third composition, it is preferable for enhancing a vari-focal ratio of the lens system to configure the optical element variable in the front principal point location as an optical element which changes a front principal point location by changing a shape of an optical surface such as a refracting surface or a reflecting surface or the like. Furthermore, the zoom lens system can have a further enhanced vari-focal ratio when the above described optical element is capable of changing a front principal point and refractive power.

Furthermore, a zoom lens system according to the present invention which has a fourth composition comprises at least one focusing lens unit which is moved for focusing out of lens units, uses at least one refractive power variable optical element in the focusing lens unit or a lens unit disposed on the object side of the focusing lens unit and has a negative product of $(\beta R(W)-\beta R(T))$ multiplied by $(\phi V(W)-\phi V(T))$, that is, satisfies the following condition (4):

$$(\beta R(W)-\beta R(T))(\phi V(W)-\phi V(T))<0.8 \ (mm^{-1}) \quad (4)$$

wherein reference symbols $\beta R(W)$ and $\beta R(T)$ represents magnifications of the lens system disposed on the image side of the focusing lens unit at the wide position and the tele position respectively.

When this condition (4) is satisfied, it is possible to moderate a change of a moving distance of the focusing lens unit which is moved for focusing at each focal length within an entire vari-focal region from the wide position to the tele position, that is, a moving distance $\Delta$ of an image surface per unit moving distance.

Furthermore a zoom lens system according to the present invention which has a fifth composition is a lens system comprising at least two lens units and configured to change a magnification from a wide position to a tele position by moving these lens units in different loci, wherein at least one lens unit out of the above described lens units has an optical element variable in a rear principal point location, and the lens system has another lens unit disposed on the image side of the lens unit which has the optical element variable in the rear principal point location and satisfies the following condition (3):

$$(DR(W)-DR(T)/(HR(W)-HR(T))<0 \quad (3)$$

wherein reference symbols DR(W) and DR(T) represent airspaces between the lens unit which has the optical element variable in the rear principal point location and the other lens unit which is disposed on the image side at the wide position and the tele position respectively, and reference symbols HR(W) and HR(T) designate rear principal point locations of the lens unit which has the optical element variable in the rear principal point location at the wide position and the tele position respectively.

The rear principal point location is defined herein as a distance as measured from a rear lens surface of the lens unit (an image side surface of the lens unit) to a rear principal point of the lens unit.

A zoom lens system which comprises two lens units, changes a focal length of the zoom lens system as a whole by changing an airspace between these lens units and moves these lens unit in different loci like the lens system according to the zoom lens system according to the present invention which has the fifth composition is capable of maintaining an image surface always constant.

Furthermore, a vari-focal ratio can be further enhanced when at least one of the lens units has an optical element variable in a rear principal point location, and this lens unit and a lens unit disposed on the image side of the lens unit are configured to satisfy the condition (3). That is, when the condition (3) is satisfied, a principal point location is changed for a long distance relative to a change of an airspace between the lens unit which has the optical element variable in the rear principal point location and the lens unit disposed on the image side of the lens unit which has the optical element caused by changing a magnification from a wide position to a tele position, thereby making it possible to configure a compact lens system which has a high vari-focal ratio.

It is preferable for enhancing a vari-focal ratio of the above described zoom lens system to configure the optical element variable in the rear principal point location as an optical element which can vary a rear principal point location by changing a shape of an optical surface such as a refracting surface, reflecting surface or the like. Furthermore, a zoom lens system which has a much higher vari-focal ratio can be obtained by configuring the optical element variable in the rear principal point location as an optical element which is capable of changing not only a rear principal point location but also refractive power.

In the next place, a refractive power variable optical element which is to be used in the zoom lens system according to the present invention may be an optical element which changes a front principal point location, a rear principal point location or refractive power by changing a refractive index of the optical element itself, an optical element which changes a front principal point location, a rear principal point location or refractive power without changing a refractive index of the optical element itself but changing a shape of the optical element, or an optical element which changes a front principal point location, a rear principal point location or refractive power by changing both a refractive index and a shape.

Furthermore, the refractive power variable optical element can be an optical element which changes only a front principal point location or an optical element which various only a rear principal point location by changing a surface shape or a refractive index.

Furthermore, there are a refractive power variable optical element which changes refractive power, a refractive power variable optical element which changes a principal point location and a refractive power variable optical element which has both functions.

Embodiments of the zoom lens system according to the present invention are configured an illustrated in FIGS. 1 through 6, and focal lengths, principal point locations of lens units, airspaces between the lens units, focal lengths, total length of the zoom lens systems in these embodiment are as listed Tables a through 6 shown below.

Figure 13:
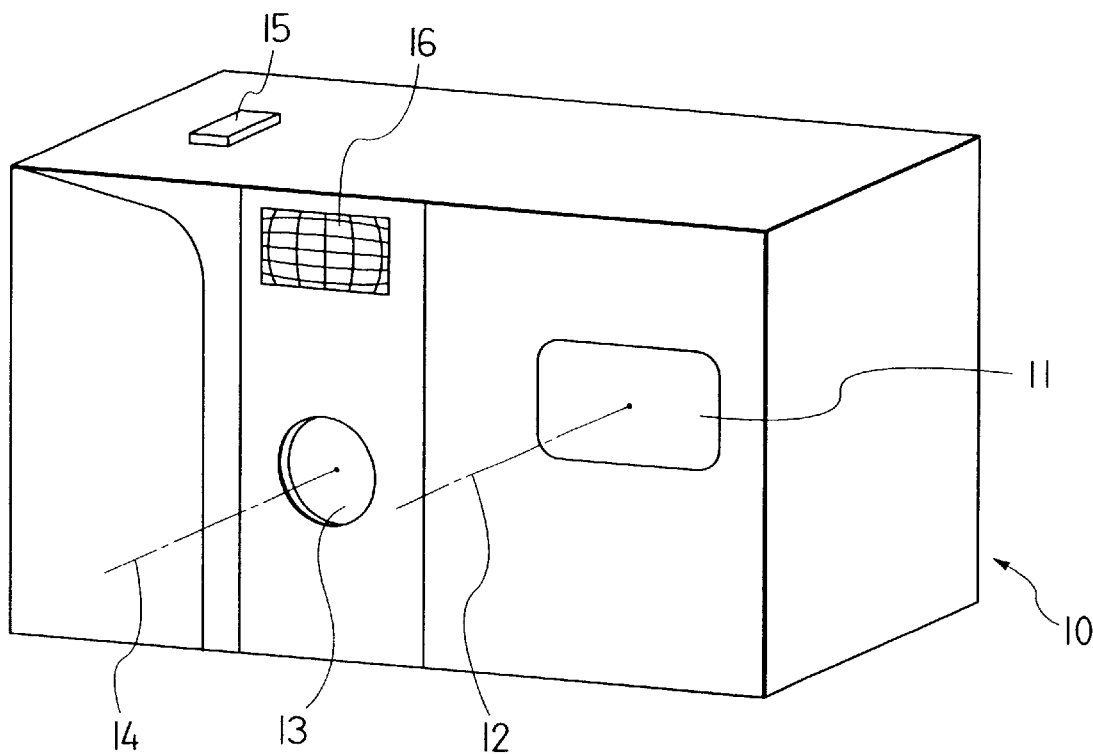
FIG. 13 is a front perspective view of an embodiment of an image pickup apparatus according to the present invention.
Figure 14:
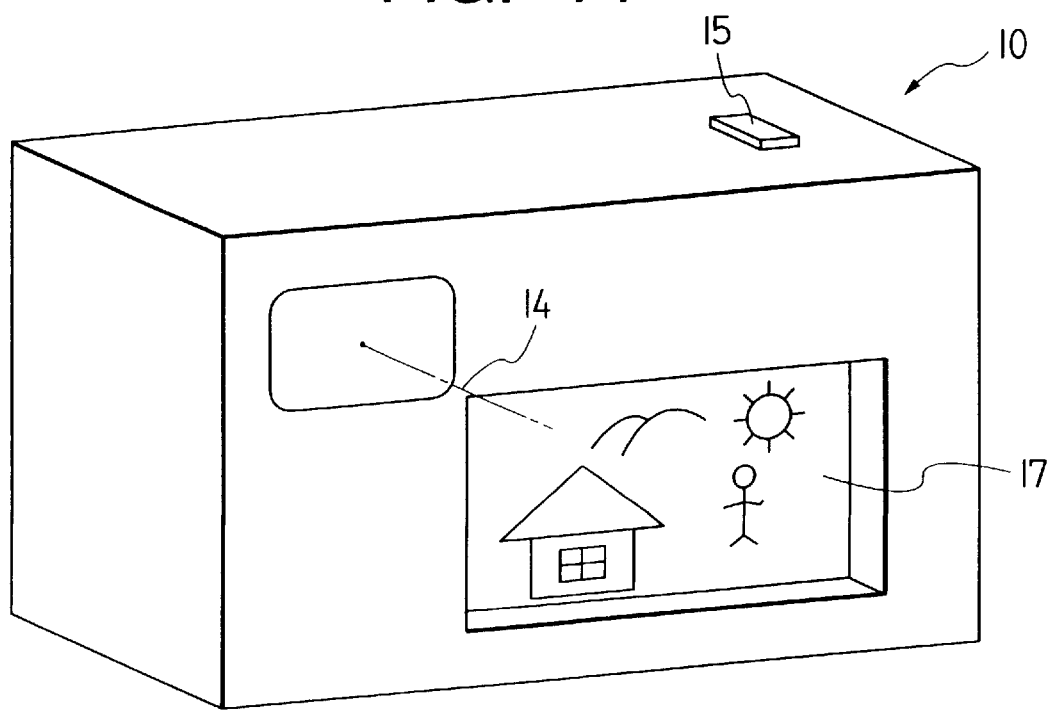
FIG. 14 is a rear perspective view of the above described image pickup apparatus.

Furthermore, Table 7 and 8 list focal lengths, principal point locations and so on of zoom lens systems shown in FIGS. 13 and 14 for comparing the embodiments of the present invention with the conventional examples.

TABLE 1

(first embodiment)

(Wide position W)

First lens unit (G1)
  f1 (W) = 30.0    HF1 (W) = 4    HR1 (W) = −4    D1 (W) = 14.65
Second lens unit (G2)
  f2 (W) = −32.2   HF2 (W) = 4    HR2 (W) = −4    D2 (W) = 5.52
Zoom lens system
  f (W) = 38.9    L (W) = 36.17

(First tele position T1)

First lens unit (G1)
  f1 (T1) = 33.3   HF1 (T1) = 4   HR1 (T1) = −4   D1 (T1) = 5.23
Second lens unit (G2)
  f2 (T1) = −29    HF2 (T1) = 4   HR2 (T1) = −4   D2 (T1) = 61.5
Zoom lens system
  f (T1) = 108.6   L (T1) = 82.83

(Second tele position T2)

First lens unit (G1)
  f1 (T2) = 33.3   HF1 (T2) = 4   HR1 (T2) = −4   D1 (T2) = 1
Second lens unit (G2)
  f2 (T2) = −29    HF2 (T2) = 4   HR2 (T2) = −4   D2 (T2) = 147.2
Zoom lens system
  f (T2) = 207.1   L (T2) = 164.2
  $\phi V (W) = -0.03106$ mm$^{-1}$,  $\phi V (T1) = 0.0345$ mm$^{-1}$
  $\phi V (T2) = 0.0345$ mm$^{-1}$
    $\phi V (T1) < \phi V (W)$
    $\phi V (T2) < \phi V (W)$

TABLE 2

(second embodiment)

(Wide position W)

First lens unit (G1)
  f1 (W) = 30     HF1 (W) = 4    HR1 (W) = −4    D1 (W) = 14.65
Second lens unit (G2)
  f2 (W) = −29    HF2 (W) = 4    HR2 (W) = −4    D2 (W) = 5.85
Zoom lens system
  f (W) = 40.2    L (W) = 36.5    Δ = 0.79

(Tele position T)

First lens unit (G1)
  f1 (T) = 33.3    HF1 (T) = 4    HR1 (T) = −4    D1 (T) = 5.23
Second lens unit (G2)
  f2 (T) = −29     HF2 (T) = 4    HR2 (T) = −4    D2 (T) = 61.5
Zoom lens system
  f (T) = 108.8    L (T) = 82.8    Δ = 9.63
  $\phi V (W) = 0.0333$ mm$^{-1}$, $\phi V (T) = 0.0300$ mm$^{-1}$
    $\phi V (T) < \phi V (W)$

TABLE 2-continued (second embodiment)

$\beta R (W) = 1.34, \beta R (T) = 3.267267$
$\phi V (W) = 0.0333\ mm^{-1}, \phi V (T) = 0.0300\ mm^{-1}$
$\beta R (W) - \beta R (T) = -1.927267$
$\phi R (W) - \phi R (T) = 0.0033$
$(\beta R (W) - \beta R (T)) (\phi R (W) - \phi R (T)) = -0.0063599\ mm^{-1} < 0$

TABLE 3

(third embodiment)

(Wide position W)

First lens unit (G1)
    $f1 (W) = 63$    $HF1 (W) = 5$    $HR1 (W) = -5$    $D1 (W) = 3.48$
Second lens unit (G2)
    $f2 (W) = 29.3$    $HF2 (W) = 10$    $HR2 (W) = -3$    $D2 (W) = 12.32$
Third lens unit (G3)
    $f3 (W) = -20.2$    $HF3 (W) = -5$    $HR3 (W) = -8$    $D3 (W) = 3.56$
Zoom lens system
    $f (W) = 39.3$    $L (W) = 45.36$    $\Delta = 2.03$ (First tele position T1)

First lens unit (G1)
    $f1 (T1) = 63$    $HF1 (T1) = 5$    $HR1 (T1) = -5$    $D1 (T1) = 12.49$
Second lens unit (G2)
    $f2 (T1) = 32.6$    $HF2 (T1) = 10$    $HR2 (T1) = -3$    $D2 (T1) = 3.31$
Third lens unit (G3)
    $f3 (T1) = -20.2$    $HF3 (T1) = -5$    $HR3 (T1) = -8$    $D3 (T1) = 62.17$
Zoom lens system
    $f (T1) = 134.9$    $L (T1) = 103.97$    $\Delta = 15.43$ (Second tele position T2)

First lens unit (G1)
    $f1 (T2) = 63$    $HF1 (T2) = 5$    $HR1 (T2) = -5$    $D1 (T2) = 13.86$
Second lens unit (G2)
    $f2 (T2) = 32.6$    $HF2 (T2) = 10$    $HR2 (T2) = -3$    $D2 (T2) = 1.94$
Third lens unit (G3)
    $f3 (T2) = -20.2$    $HF3 (T2) = -5$    $HR3 (T2) = -8$    $D3 (T2) = 89.67$
Zoom lens system
    $f (T2) = 179.58$    $L (T2) = 131.47$ $\phi V (W) = 0.0341\ mm^{-1}, \phi V (T1) = 0.0307\ mm^{-1}$
$\phi V (T2) = 0.0307\ mm^{-1}$
$\phi V (T1) < \phi V (W)$
$\phi V (T2) < \phi V (W)$
$\beta R (W) = 1.571659, \beta R (T1) = 4.473678$
$\phi V (W) = 0.0341\ mm^{-1}, \phi V (T1) = 0.0307\ mm^{-1}$
$\beta R (W) - \beta R (T1) = -2.902019$
$\phi R (W) - \phi V (T1) = 0.0034\ mm^{-1}$
$(\beta R (W) - \beta R (T1)) (\phi R (W) - \phi R (T1)) = -0.0098668\ mm^{-1} < 0$
$\beta R (T2) = 7.181643, (\beta V (T2) = 0.0307$
$\beta R (W) - \beta R (T2) = -5.609984$
$\phi R (W) - \phi V (T2) = 0.0034\ mm^{-1}$
$(\beta R (W) - \beta R (T2)) (\phi R (W) - \phi R (T2)) = -0.0190739\ mm^{-1} < 0$

TABLE 4

(fourth embodiment)

(Wide position W)

First lens unit (G1)
    $f1 (W) = 63$    $HF1 (W) = 5$    $HR1 (W) = -5$    $D1 (W) = 3.48$
Second lens unit (G2)
    $f2 (W) = 29.3$    $HF2 (W) = 9$    $HR2 (W) = -4$    $D2 (W) = 12.32$
Third lens unit (G3)
    $f3 (W) = -20.2$    $HF3 (W) = -5$    $HR3 (W) = -8$    $D3 (W) = 1.6$
Zoom lens system
    $f (W) = 36.4$    $L (W) = 43.4$ (Tele position T)

First lens unit (G1)
    $f1 (T) = 63$    $HF1 (T) = 5$    $HR1 (T) = -5$    $D1 (T) = 13.86$ TABLE 4-continued (fourth embodiment)

Second lens unit (G2)
    f2 (T) = −29.3    HF2 (T) = 11    HR2 (T) = −2    D2 (T) = 1.94
Third lens unit (G3)
    f3 (T) = −20.2    HF3 (T) = −5    HR3 (T) = −8    D3 (T) = 85.92
Zoom lens system
    f (T) = 167.2    L (T) = 127.7
    $\phi$ V (W) = 0.0341 mm$^{-1}$, $\phi$ V (T) = 0.0341 mm$^{-1}$
    $\phi$ V (W) = $\phi$ V (T)
DF (W) = 3.48, DF (T) = 13.86,
HF (W) = 9, HF (T) = 11
DF (W) − DF (T) = −10.38
HF (W) − HF (T) = −2
(DF (W) − DF (T))/(HF (W) − HF (T)) = 5.19 > 0
DR (W) = 12.32, DR (T) = 1.94,
HR (W) = −4, HR (T) = −2
DR (W) − DR (T) = 10.38
HR (W) − HR (T) = −2
(DR (W) − DR (T))/(HR (W) − HR (T)) = −5.19 < 0

TABLE 5

(fifth embodiment)

(Wide position W)

First lens unit (G1)
    f1 (W) = 63    HF1 (W) = 5    HR1 (W) = −5    D1 (W) = 3.48
Second lens unit (G2)
    f2 (W) = 29.3    HF2 (W) = 9    HR2 (W) = −4    D2 (W) = 12.32
Third lens unit (G3)
    f3 (W) = −20.2    HF3 (W) = −5    HR3 (W) = −3    D3 (W) = 1.6
Zoom lens system
    f (W) = 36.4    L (W) = 43.4
(Tele position T)

First lens unit (G1)
    f1 (T) = 63    HF1 (T) = 5    HR1 (T) = −5    D1 (T) = 13.86
Second lens unit (G2)
    f2 (T) = 32.6    HF2 (T) = 11    HR2 (T) = −2    D2 (T) = 1.94
Third lens unit (G3)
    f3 (T) = −20.2    HF3 (T) = −5    HR3 (T) = −8    D3 (T) = 122.79
Zoom lens system
    f (T) = 233.6    L (T) = 164.6
    $\phi$ V (W) = 0.0341 mm$^{-1}$, $\phi$ V (T) = 0.0307 mm$^{-1}$
    $\phi$ V (T) < $\phi$V (W)
DF (W) = 3.48, DF (T) = 13.86,
HF (W) = 9, HF (T) = 11
DF (W) − DF (T) = −10.38
HF (W) − HE (T) = −2
(DF (W) − DF (T))/(HF (W) − HF(T)) = 5.19 > 0
DR (W) = 12.32, DR (T) = 1.94,
HR (W) = −4, HR (T) = −2
DR (W) − DR (T) = 10.38
HR (W) − HR (T) = −2
(DR (W) − DR (T))/(HR (W) − HR (T)) = −5.19 < 0

TABLE 6

(sixth embodiment)

(Wide position W)

First lens unit (G1)
    f1 (W) = 63    HF1 (W) = 6    HR1 (W) = −4    D1 (W) = 3.48
Second lens unit (G2)
    f2 (W) = 29.3    HF2 (W) = 10    HR2 (W) = −3    D2 (W) = 13.32
Third lens unit (G3)
    f3 (W) = −22.4    HF3 (W) = −5    HR3 (W) = −8    D3 (W) = 1.17
Zoom lens system
    f (W) = 34.8    L (W) = 44

TABLE 6-continued (sixth embodiment)

(Tele position T)

First lens unit (G1)
    f1 (T) = 70    HF1 (T) = 5    HR1 (T) = −5    D1 (T) = 13.86
Second lens unit (G2)
    f2 (T) = 29.3    HF2 (T) = 10    HR2 (T) = −3    D2 (T) = 1.94
Third lens unit (G3)
    f3 (T) = −20.2    HF3 (T) = −6    HR3 (T) = −9    D3 (T) = 173.67
Zoom lens system
    f (T) = 292.7    L (T) = 215.5
  (First lens unit)
    $\phi$ V (W) = 0.0159 mm$^{-1}$, $\phi$ V (T) = 0.0143 mm$^{-1}$
      $\phi$ V (T) < $\phi$ V (W)
    DR (W) = 3.48, DR (T) = 13.86,
    HR (W) = −4, HR (T) = −5
    DR (W) − DR (T) = −10.38
    HR (W) − HR (T) = 1
    (DR (W) − DR (T))/(HR (W) − HR (T)) = −10.38 < 0
  (Third lens unit)
    $\phi$ V (W) = 0.0446 mm$^{-1}$, $\phi$ V (T) = −0.0495 mm$^{-1}$
      $\phi$ V (T) < $\phi$ V (W)
    DF (W) = 13.32, DF (T) = 1.94,
    HF (W) = −5, HF (T) = −6
    DF (W) − DF (T) = 11.38
    HF (W) − HF (T) = 1
    (DF (W) − DF (T))/(HF (W) − HF (T)) = 11.38 > 0
    DR (W) = 1.17, DR (T) = 173.67,
    HR (W) = −8, HR (T) = −9
    DR (W) − DR (T) = −172.50
    HR (W) − HR (T) = 1
    (DR (W) − DR (T))/(HR (W) − HR (T)) = −172.50 < 0

TABLE 7

(conventional example 1)

(Wide position W)

First lens unit (G1)
    f1 (W) = 30    HF1 (W) = 4    HR1 (W) = −4    D1 (W) = 14.65
Second lens unit (G2)
    f2 (W) = −29    HF2 (W) = 4    HR2 (W) = −4    D2 (W) = 5.85
Zoom lens system
    f (W) = 40.2    L (W) = 36.5    Δ = 0.79

(Tele position T)

First lens unit (G1)
    f1 (T) = 30.0    HF1 (T) = 4    HR1 (T) = −4    D1 (T) = 1
Second lens unit (G2)
    f2 (T) = −29.0    HF2 (T) = 4    HR2 (T) = −4    D2 (T) = 72.13
Zoom lens system
    f (T) = 108.8    L (T) = 89.1    Δ = 12.12

TABLE 8

(conventional example 2)

(Wide position W)

First lens unit (G1)
    f1 (W) = 63    HF1 (W) = 5    HR1 (W) = −5    D1 (W) = 3.48
Second lens unit (G2)
    f2 (W) = 29.3    HF2 (W) = 10    HR2 (W) = −3    D2 (W) = 12.32
Third lens unit (G3)
    f3 (W) = −20.2    HF3 (W) = −5    HR3 (W) = −8    D2 (W) = 3.56
Zoom lens system
    f (W) = 39.3    L (W) = 45.36    Δ = 2.08

(Tele position T)

First lens unit (G1)
    f1 (T) = 63    HF1 (T) = 5    HR1 (T) = −5    D1 (T) = 13.86

TABLE 8-continued (conventional example 2)

Second lens unit (G2)
    f2 (T) = 29.3    HF2 (T) = 10    HR2 (T) = −3    D2 (T) = 1.94
Third lens unit (G2)
    f3 (T) = −20.2    HF3 (T) = −5    HR3 (T) = −8    D3 (T) = 65.39
Zoom lens system
    f (T) = 134.9    L (T) = 107.2    Δ = 16.88

In the above tables, reference symbols f1(W), f1(T1) and f1(T2) represent focal lengths (all in a unit of mm) of a first lens unit G1 at a wide position, a first tele position and a second tele position respectively, reference symbols HF1 (W), HF1(T1) and HF1(T2) designate front principal point locations (all in the unit of mm) of the first lens unit G1 at the wide position, the first tele position and the second tele position respectively, reference symbols HR1(W), HR1(T1) and MR1(T2) denote rear principal point locations (all in the unit of mm) of the first lens unit G1 at the wide position, the first tele position and the second tele position respectively, reference symbols D1(W), D1(T1) and D1(T2) represent airspaces (all in the unit of mm) between the first lens unit G1 and a second lens unit G2 at the wide position, the first tele position and the second tele position respectively, reference symbols D2(W), D2(T1) and D2(T2) designate airspaces (all in the unit of mm) between the second lens unit G2 and a third lens unit G3 or airspaces between the second lens unit G2 and an image surface in case of the zoom lens system composed of the two lens units at the wide position, the first tele position and the second tele position respectively, reference symbols D3(W), D3(T1) D3(T2) denote airspaces (all in the unit of mm) between the third lens unit and the image surface at the wide position, the first tele position and the second tele position respectively, reference symbols f(W), f(T1) and f(T2) represent focal lengths (all in the unit of mm) of the zoom lens system as a whole at the wide position, the first tele position and the second tele position respectively, and reference symbols L(W), L(T1) and L(T2) designate total lengths (lengths as measured from an object side surface of the first lens unit G1 to the image surface 1 in the unit of mm) all of which are expressed in the unit of mm. Furthermore, a focusing sensitivity has a value of a distance of a movement of the image surface caused by moving the focusing lens unit for 0.01 mm multiplied by 100.

Figure 2:
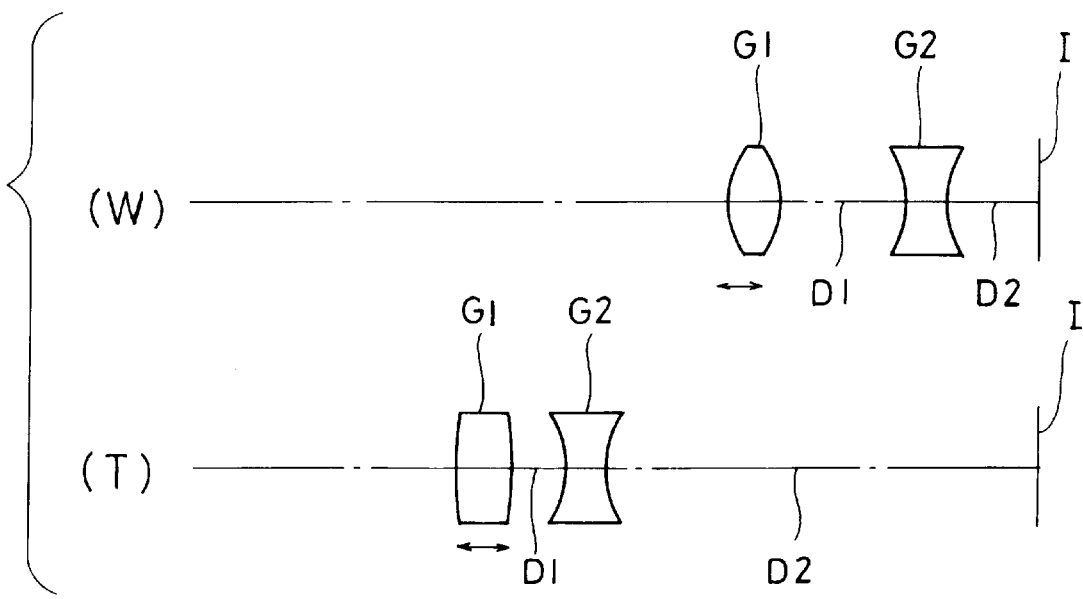
FIG. 2 is a diagram showing a composition of a second embodiment of the zoom lens system according to the present invention.
Figure 3:
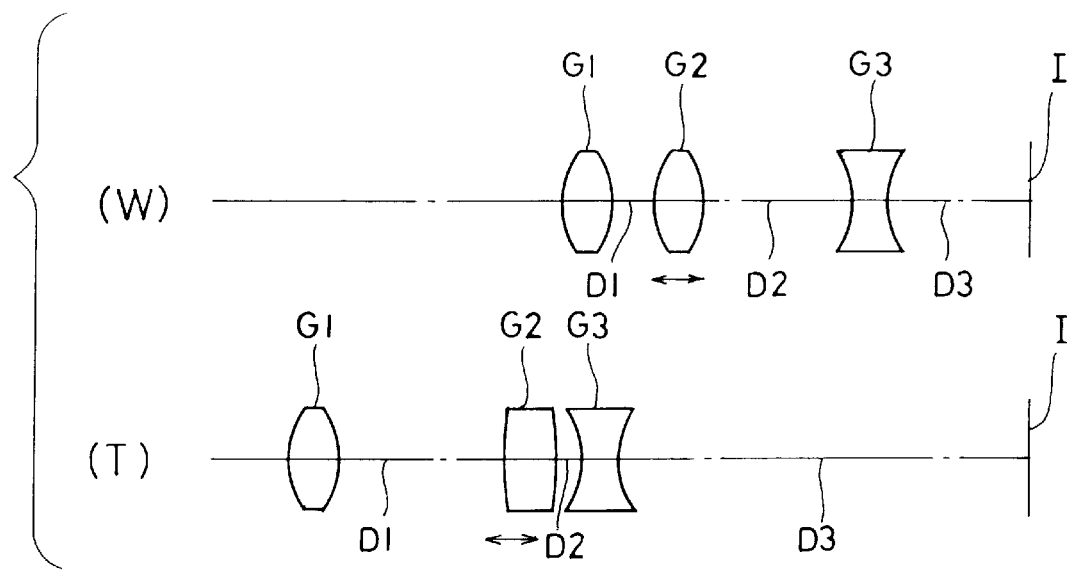
FIG. 3 is a diagram showing a composition of a third embodiment of the zoom lens system according to the present invention.
Figure 4:
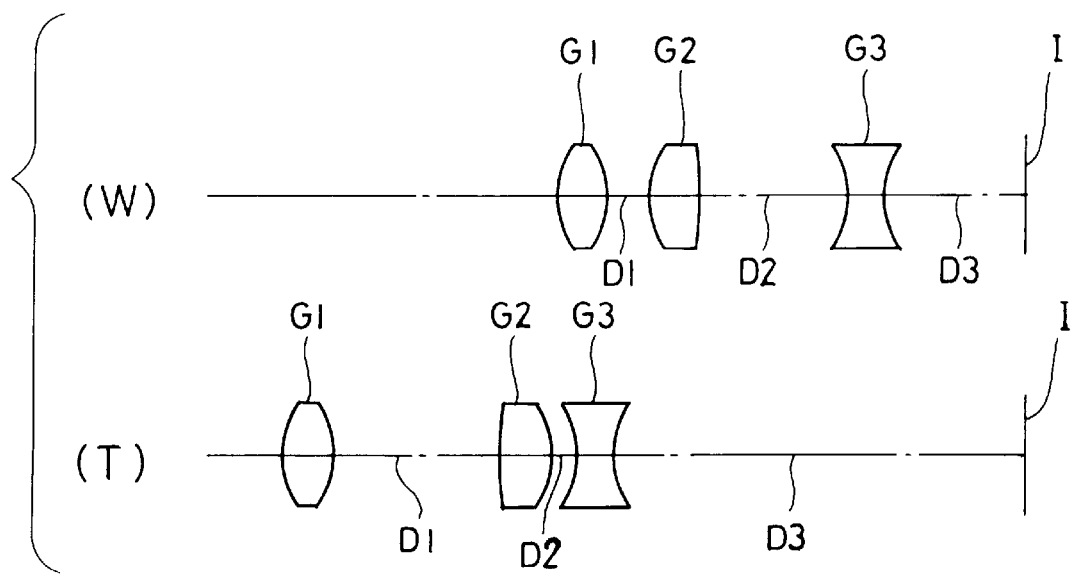
FIG. 4 is a diagram showing a composition of a fourth embodiment of the zoom lens system according to the present invention.
Figure 16:
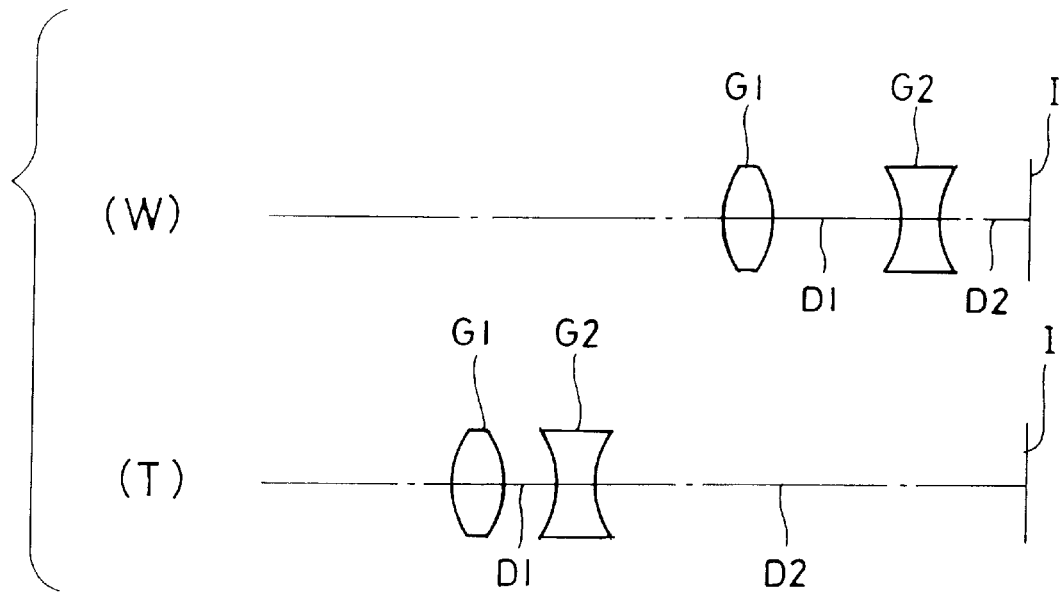
FIG. 16 is a diagram showing a composition of a conventional zoom lens system composed of two lens units.

Out of the embodiments described above, the first and second embodiments shown in FIGS. 1 and 2 are examples in which refractive power variable optical elements are applied to the conventional example 1 having numerical data listed in Table 7 which is a zoom lens system consisting of two positive and negative lens units shown in FIG. 16.

The zoom lens system preferred as the first embodiment of the present invention comprises a first lens unit G1 having positive refractive power and a second lens unit G2 having negative refractive power as shown in FIG. 1, uses refractive power variable optical elements in the first lens unit G1 and the second lens unit G2, and changes a magnification from the wide position to the tele position by moving the first lens unit and the second lens unit toward the object side in different loci. The positive refractive power of the first lens unit is weakened by a function of the refractive power variable optical element, whereas the negative refractive power of the second lens unit is strengthened by the function of the refractive power variable optical element.

Speaking more concretely of the zoom lens system preferred as the first embodiment of the present invention, the focal lengths f1 and f2 of the first lens unit and the second lens unit are changed from f1(W) and f2(W) at the wide position to f2(W) and f2(T) at the tele position, or the focal length of the first lens unit is prolonged from f1(W)=30.0 mm to f1(T)=33.3 mm and the focal length of the second lens unit is shortened from |f2(W)|=32.2 mm to |f2(T)|=29 mm from the wide position to the tele position as listed in Table 1. The positive refractive power of the first lens unit is weakened or the negative refractive power of the second lens unit is strengthened by the refractive power variable optical elements as described above. Furthermore, f1(W) is shorter than f1(T) and f2(W) is shorter than f2(T), thereby satisfying the condition (1).

In the first embodiment, the zoom lens system has a focal length at the first tele position which is nearly the same as that of the conventional example 1. Though the zoom lens system has a vari-focal ratio which is nearly the same as of the conventional example 1, the fist embodiment has a variation distance of a zoom airspace and a total length which are shorter than those of this conventional example. In addition, the vari-focal ratio of the zoom lens system can be enhanced by configuring the first embodiment so as to have a variation distance and a total length which are the same as those of the conventional example. In addition, the vari-focal ratio of the first embodiment can be enhanced by configuring the first embodiment so as to have a moving distance of a focusing lens unit and a total length which are the same as those of the conventional example.

At the second tele position of the first embodiment, the airspace D1(T2) is the same as that in the conventional example 1, thereby enhancing a vari-focal ratio. The conventional example 1 has a vari-focal ratio of approximately 2.7 as described above and the first embodiment of the present invention has a vari-focal ratio of approximately 2.8 from the wide position (W) to the first tele position (T1) which is similar to that of the conventional example 1 of zoom lens system but a vari-focal ratio of approximately 5.2 from the wide position (W) to the second tele position (T2) which is about twice as high.

The zoom lens system preferred as the first embodiment is capable of enhancing the vari-focal ratio by prolonging the total length of the zoom lens system as a whole to the second tele position as described above.

The zoom lens system preferred as the first embodiment uses the refractive power variable optical elements in both the first lens unit and the second lens unit, and changes refractive power of the first lens unit and the second lens unit by the functions of the refractive power variable optical elements at a stage to change a magnification from the wide position to the tele position as described above, whereby the lens system has a shorter total length without lowering a vari-focal ratio.

A zoom lens system preferred as the second embodiment has a composition shown in FIG. 2, wherein the lens system comprises a first lens unit having positive refractive power and a second lens unit having negative refractive power, and changes a magnification from a wide position to a tele position by moving both the lens units toward the object side while narrowing an airspace between the first lens unit and the second lens unit.

In the second embodiment, the first lens unit has a refractive power variable optical element, both the lens units are moved toward the object side while narrowing the airspace between the first lens unit and the second lens and the positive refractive power of the first lens unit is weakened by a function of the refractive power variable optical element at a stage of the above described change from the wide position to the tele position. Speaking more concretely, the first lens unit has a focal length f1(W)=30 at a wide position and a focal length f1(T)=33.3 at a tele position as listed in Table 2, whereby a focal length f1 of the first lens unit is in a relation of F1(W)<F1(T) and satisfies the condition (1). Accordingly, the first embodiment has a vari-focal ratio which is the same as that of the conventional example 1 shown in FIG. 16 and Table 7 and a shorter total length.

The second embodiment is configured as a compact lens system which reduces a change amount of a zooming airspace by the function of the refractive power variable optical element of the first lens unit, thereby shortening a total length.

Furthermore, the second embodiment is focused using the first lens unit and has a low focusing sensitivity.

For the second embodiment, only a tele position is described.

The second embodiment which uses the refractive power variable optical element in the first lens unit G1 has a vari-focal ratio which is the same as that of the conventional example 1 shown in Table 7 and a total length shortened by changing refractive power owing to the function of the refractive power variable optical element. Furthermore, a focusing sensitivity is lowered by the function of the above described refractive power variable optical element.

Zoom lens system preferred as the third, fourth, fifth and sixth embodiment are as shown in FIGS. 3, 4, 5 and 6 respectively, in which each zoom lens system comprises, in order from the object side, a first lens unit G1 having positive refractive power, a second lens unit G2 having positive refractive power and a third lens unit G3 having negative refractive power, the first lens unit G1 is moved toward the object side together with the third lens unit G3 and the second lens unit G2 toward the object side in a different locus for a change of a magnification. The magnification can be changed not by moving the first lens unit G1 together with the third lens unit G3 by moving all the lens units toward the object side in different loci. These embodiments use refractive power variable optical elements and/or optical elements variable in front principal point locations and optical elements variable in rear principal points in compositions similar to that of the conventional example 2 shown in FIG. 17 and Table 8.

The zoom lens system preferred as the third embodiment is a lens system in which the second lens unit has a refractive power variable optical element, and the first lens unit G1 and the second lens unit G2 are moved toward the object side which broadening an airspace and the third lens unit G3 is moved toward the object side while narrowing an airspace between the second lens unit G2 and the third lens unit G3 for a change of a magnification from a wide position to a tele position. The refractive power of the second lens unit G2 is weakened by the refractive power variable optical element used in the second lens unit G2.

The lens system preferred as the third embodiment as a whole has a focal length at a first tele position T1 which is equal to that of the conventional example 2 at the tele position and an airspace D2(T2) between the second lens unit and the third lens unit is equal to an airspace D2(T2) in the conventional example 2 shown in Table 8.

In the third embodiment of the present invention, a focal length of the second lens unit G2 is f2(W)=29.3 mm at the wide position and f2(T1)=32.6 mm at a first tele position, whereby the focal length is in a relation of f2(W)<f2(T1) and satisfies the condition (1).

Figure 17:
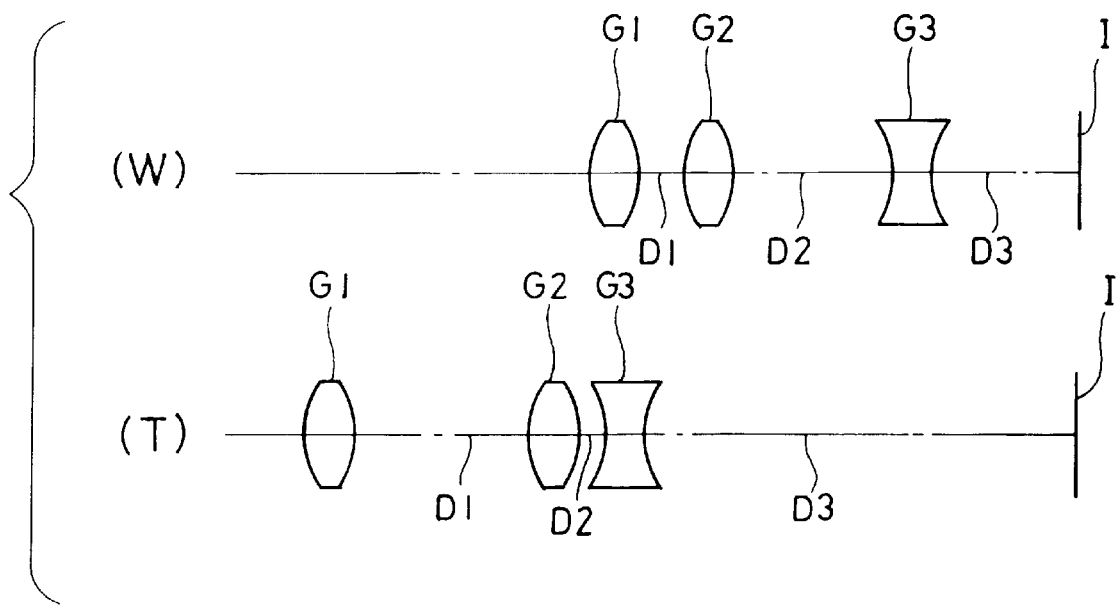
FIG. 17 is a diagram showing a composition of a conventional zoom lens system composed of three lens units.

The third embodiment which uses the refractive power variable optical element in the second lens unit lens changes a zooming airspace and has a shorter total length at the first tele position than the zoom lens system selected as the conventional example 2 shown in FIG. 17 and Table 8 which has the same composition as that of this embodiment.

Furthermore, the third embodiment has a high vari-focal ratio of approximately 4.6 at the second tele position.

The lens system preferred as the third embodiment is a zoom lens system which comprises three positive lens unit, positive lens unit and negative lens unit, has a vari-focal ratio equal to that of the conventional example and is configured to be compact and have a short total length owing to a function of the refractive power variable optical element of the second lens unit G2 as described above. Furthermore, the third embodiment can have a high vari-focal ratio with the same changing distance of the airspace between the second lens unit and the third lens unit.

Furthermore, the third embodiment is focused with the second lens unit G2 having the refractive power variable optical element and has a low focusing sensitivity.

A zoom lens system preferred as the fourth embodiment uses a refractive power variable optical element disposed in a second lens unit G2. This zoom lens system changes a magnification from a wide position to a tele position by moving a first lens unit G1 and the second lens unit G2 toward the object side while broadening an airspace and moving the second lens unit G2 and a third lens unit G3 toward the object side while narrowing an airspace.

The fourth embodiment which uses the refractive power variable optical element in the second lens unit G2 changes principal point locations on the object side and the image side of the second lens unit without changing a focal length of the lens unit. Speaking more concretely, principal point locations HF1 and HR1 of the first lens unit G1 are HF1(W)=5 mm, HR1(W)-5 mm at a wide position and HF1(T)=5 mm, HR1(T)-5 mm at the tele position, the principal point locations HF2 and HR2 of the second lens unit G2 are HF2(W)=9 mm, HR2(W)=−4 mm at the wide position and HF2(T)=11 mm, HR2(T)=−2 mm at the tele position, and principal point locations HF3 and HR3 of the third lens unit G3 are HF3(W)=−5 mm, HR3(W)=−8 mm at the wide position and HF3(T)=−5 mm, HR3(T)=−8 mm as listed in Table 4, whereby the principal point locations of the second lens unit G2 having the refractive power variable optical element are changed. A distance between the principal points of the first lens unit G1 and the second lens unit G2 and a distance between principal points of the second lens unit G2 and the third lens unit G3 are changed for a change of a magnification from the wide position to the tele position as described above.

In the zoom lens system selected as the conventional example 2 shown in Table 8, on the other hand, principal point locations HF1 and HR1 of a first lens unit G1 are HF1(W)=HF1(T)=5 mm and HR1(W)=HR1(T)=−5 mm both at a wide position and a tele position, principal point locations HF2 and HR2 of a second lens unit G2 are HF2(W)=HF2(T)=10 mm and HR2(W)=HR2(T)=−3 mm and principal point locations HF3 and HR3 of a third lens unit G3 are HF3(W)=HF3(T)=−5 mm and HR3 (W)=HR3 (T)=−8 mm.

The zoom lens system preferred as the fourth embodiment of the present invention is capable of making the distance between the principal points of the first lens unit GI and the second lens unit G2 at the wide position, and a distance between the principal points of the second lens unit G2 and the third lens unit G3 at the wide position as compared with the conventional example 2 which is a zoom lens system also composed of three lens units.

A vari-focal ratio of approximately 3.4 of the conventional example 2 is enhanced to approximately 4.6 by varying the distances between the principal points as described above.

The fourth embodiment of the present invention is an example of zoom lens system which has a vari-focal ratio enhanced by a function of a refractive power variable optical element while keeping a total length kept unchanged. In other words, the fourth embodiment is an example of zoom lens system composed of three positive lens unit, positive lens unit and negative lens unit, in which the second positive lens unit is configured as a lens unit having a refractive power variable optical element and a vari-focal ratio is enhanced by a function of the refractive power variable optical element.

Figure 5:
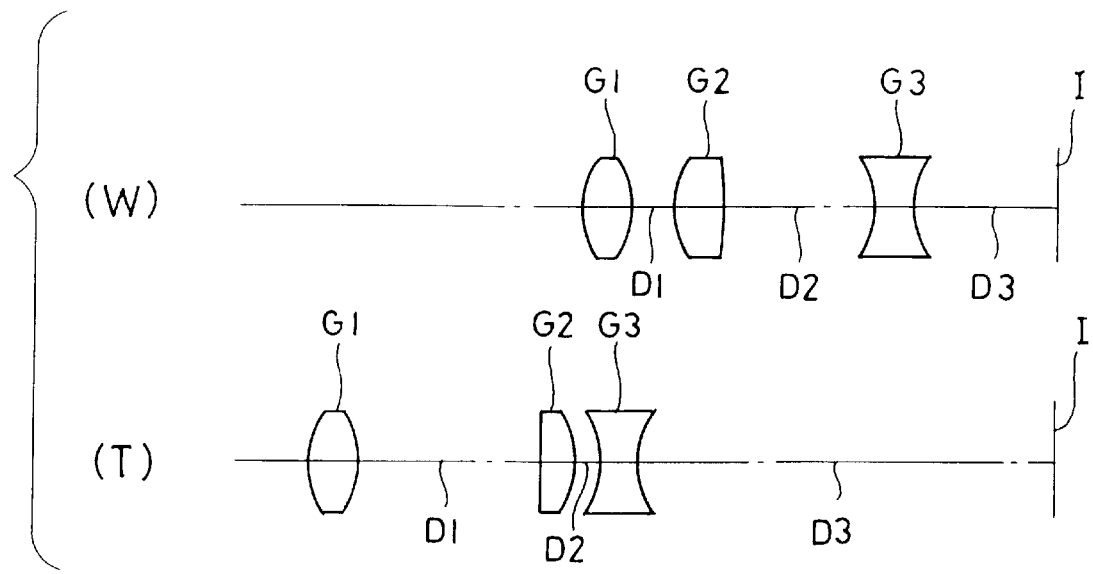
FIG. 5 is a diagram showing a composition of a fifth embodiment of the zoom lens system according to the present invention.

A zoom lens system preferred as the fifth embodiment of the present invention has a composition shown in FIG. 5 and uses a refractive power variable optical element in a second lens unit G2. The zoom lens system preferred as the fifth embodiment changes a magnification from a wide position to a tele position by moving a first lens unit G1 toward the object side while broadening an airspace between the first lens unit G1 and the second lens unit G2 and moving a third lens unit G3 toward the image side while narrowing an airspace between the second lens unit G2 and the third lens unit G3. By a function of the refractive power variable optical element, refractive power of the second lens unit G2 is weakened and a principal point of the second lens unit is moved toward the image side. Speaking concretely, a focal length f2 of the second lens unit G2 is f2(W)=29.3 mm at the wide position and f2(T)=32.6 mm at the tele position, thereby being in a relation of f2(W)<f2(T). That is, the focal length of the second lens unit G2 satisfies the condition (1). Furthermore, object side principal points of the second lens unit are HF2(W)=9 mm, HF2(T)=11 mm, HR2(W)=−4 mm and HR2(T)=−2 mm, thereby being moved toward the image side.

Owing to a function of the refractive power variable optical element used in the fifth embodiment, the second lens unit G2 has refractive power at the tele position which is weaker than that at the wide position and a principal point of the second lens unit G2 is moved toward the image side, whereby the zoom lens system has a vari-focal ratio of approximately 6.4 which is about twice as high as the vari-focal ratio of approximately 3.4 of the conventional example 2 shown in Table 8.

The fifth embodiment is a zoom lens system which is composed of the three positive lens unit, positive lens unit and negative lens units and moves the principal point locations by the refractive power variable optical element. In short, the second lens unit G2 has the refractive power variable optical element which has the function to remarkably enhance a vari-focal ratio by changing the refractive power and the principal point locations.

Figure 6:
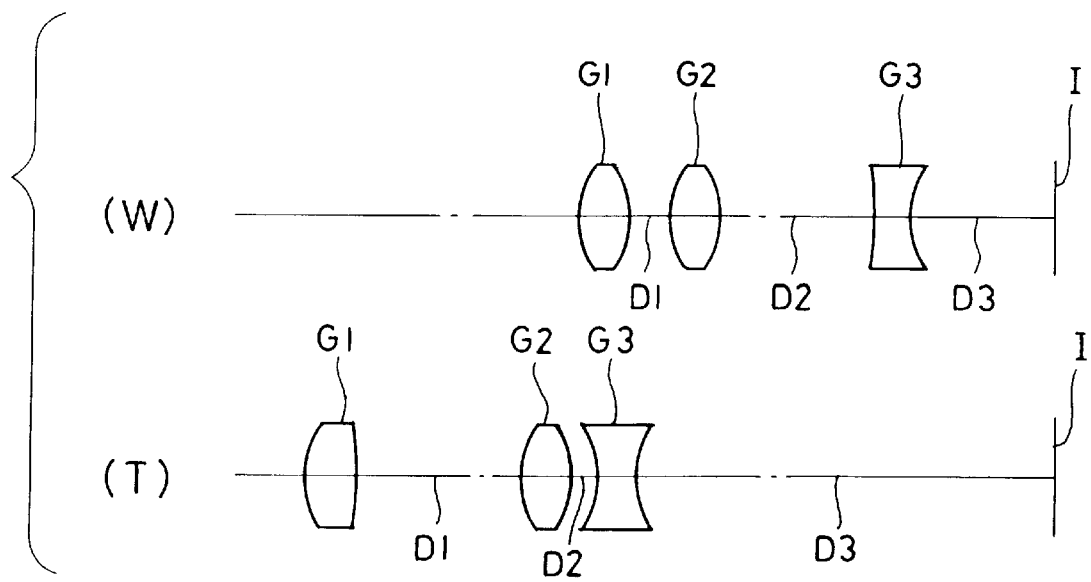
FIG. 6 is a diagram showing a composition of a sixth embodiment of the zoom lens system according to the present invention.

Furthermore, the sixth embodiment of the present invention comprises, in order from the object side, a first positive lens unit G1, a second positive lens unit G2 and a third negative lens unit G3 as shown in FIG. 6, and changes a magnification by moving the lens units as shown in the drawing. Speaking more concretely, the magnification is changed from a wide position to a tele position by moving the first lens unit G1 toward the object side while broadening an airspace between the first lens unit G2 and the second lens unit G2, and moving the third lens unit G3 toward the object side while narrowing an airspace between the second lens unit G2 and the third lens unit G3. In a zoom lens system preferred as this embodiment, the first lens unit G1 and the third lens unit G3 are lens units which have refractive power variable optical elements.

In the zoom lens system preferred as the sixth embodiment, the refractive power variable optical elements functions to move the principal points of the first lens unit G1 toward the object side and weak the positive refractive power, and move the principal points of the third lens unit G3 toward the object side and strengthen the negative refractive power.

Speaking more concretely, the first lens unit G1 has principal point locations of HF1(W)=6 mm, HR1(W)=−4 mm, HF1(T)=5 mm and HR(T)=−5 mm which are moved toward the object side, and focal points of f1(W)=63 mm and f1(T)=70 mm which are in a relation of f1(W)<f1(T), whereas the third lens unit G3 has principal point locations of HF3(W)=−5 mm, HF3(T)=−6 mm, HR3(W)=−8 mm and HR3(T)=−9 mm which are moved toward the object side, and focal points of f3(W)=−22.4 mm and f3(T)=−20.2 mm which are in a relation of $|f3(W)|>|f3(T)|$. The refractive power variable optical elements of the first and third lens units satisfy the condition (1).

Owing to functions of the refractive power variable optical elements of the first lens unit G1 and the third lens unit G3, the sixth embodiment has a total length which is substantially the same as that of the conventional example 2 and a vari-focal ratio of approximately 8.4 which is remarkably enhanced to about 2.5 times as high as that of the conventional example.

The sixth embodiment is an example of zoom lens system comprising the first lens unit G1 and the third lens unit G3 having the refractive power variable optical elements which change the refractive power and the principal point locations, thereby enhancing a vari-focal ratio.

The zoom lens system according to the present invention is configured to comprise the refractive power variable optical elements in all or some of the lens units as described above and change only refractive power, only principal point locations or both the refractive power and the principal point locations, thereby shortening a total length while maintaining a desired vari-focal ratio or enhancing a vari-focal ratio while maintaining a short total length.

In addition, any lens unit may be used as a focusing lens unit in the fourth, fifth and sixth embodiments.

Though front principal points and rear principal points of the respective lens units are coincident with each other in the embodiments described above, it is apparent that a case in which a front principal point is not coincident with a rear principal point is also included in the present invention. Furthermore, thickness of each lens unit is assumed to be as an amount required for correction of aberrations, the lens system according to the present invention can be composed regardless of thickness of lens units. Furthermore, refractive power of positive lenses and negative lenses is changed so as to be weakened for comparing the embodiments with the conventional examples. This is because weaker refractive power is more advantageous for correction of aberrations. However, effects to enhance a vari-focal ratio and reduce an amount to be changed for zooming can be also obtained even when the refractive power of the positive lenses and negative lenses is changed in a direction to be weakened.

Furthermore, refractive power of the lens unit is changed about 10% by the function of the refractive power variable optical element in each of the embodiments described above, it is possible to obtain a lens system in which refractive power is changed at a ratio other than 10%.

FIGS. 7A, 7B, 7C, 8A, 8B, 8C, 9A, 9B, 9C, 10, 11 and 12 are diagrams showing an outline of a refractive power variable optical element to be used in the zoom lens system according to the present invention.

Figure 7A:
FIGS. 7A, 7B and 7C are diagrams showing an example of a lens whose refractive power is changed by changing shapes of surfaces of a refractive power variable optical element.
Figure 7B:
Figure 7C:
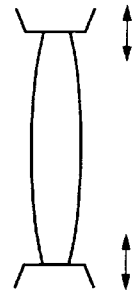
Figure 8A:
FIGS. 8A, 8B and 8C are diagrams showing an example of lens whose principal point locations are changed by changing shapes of surfaces of a refractive power variable optical element.
Figure 8B:
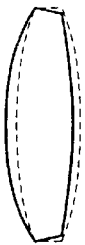
Figure 8C:
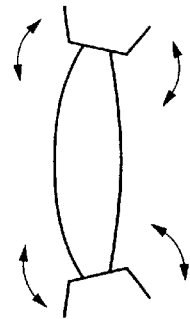
Figure 9A:
FIGS. 9A, 9B and 9C are diagrams showing an example of lens whose refractive power and principal points are changed by changing shapes of surfaces of a refractive power variable optical element.
Figure 9B:
Figure 9C:
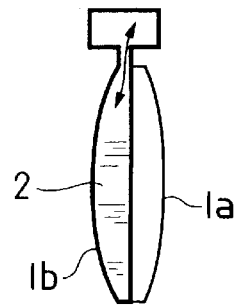

Out of these drawings, FIGS. 7A, 7B, 7C, 8A, 8B, 8C, 9A, 9B and 9C show refractive power variable optical elements which utilize changes of surface shapes; FIGS. 7A, 7B and 7C showing an example where refractive power of an element is changed by changing a shape of the element. FIGS. 8A, 8B and 8C showing an example where principal point locations are changed by changing a shape of an element, and FIGS. 9A, 9B and 9C showing an example where refractive power and principal point locations are changed by changing a shape of an element.

FIG. 7A shows a convex lens before a change of its shape and FIG. 7B shows a shape of the convex lens traced in solid lines which is changed from a shape traced in dashed lines. After the change of the shape, curvature on both surfaces are lowered, whereby the convex lens has a weaker refractive power.

In order to change the shape as described above, the convex lens is made of a soft material or formed by enclosing a transparent liquid in a soft material and a compressing force or an elongating force is applied from a circumference of the lens, for example, as shown in FIG. 7C.

An example is shown where a shape of a convex lens before a change shown in FIG. 8A is changed as traced in solid lines in FIG. 8B after the change. In case of this example, curvature is lowered on a left side surface and curvature is enhanced on a right side surface, thereby changing principal point locations. Furthermore, refractive power remains unchanged even after the change.

In order to change the shape as shown in FIG. 8B, the lens is made of a soft material or formed by enclosing a transparent liquid in a soft material as described above, and a surface is compressed from a circumference and the other surface is elongated from the circumference as shown in FIG. 8C.

An example is shown where a shape of a convex lens before a change shown in FIG. 9A is changed as traced in chain lines in FIG. 9B after the change, in this example, only a left side surface of the convex surface is changed and a right side surface remains substantially unchanged after the change of the shape. In other words, curvature is enhanced on the left side surface and change of curvature is nearly 0 on the right side surface. Accordingly, both refractive power and principal point locations are changed after the change of the shape.

In order to change a shape of a lens as shown in FIG. 9B, a surface 1a of a lens is made of a hard material such as glass, a surface 1b on the other side is made of a soft material, and a transparent liquid 2 is enclosed, whereby a shape can be changed by varying an enclosed amount by filling and discharging the liquid.

Only refractive power, only principal point locations and both refractive power and principal points can be changed as desired by changing a shape as shown in FIGS. 7A, 7B, 7C, 8A, 8B, 8C, 9A, 9B and 9C and optionally selecting amounts of changes.

Figure 10:
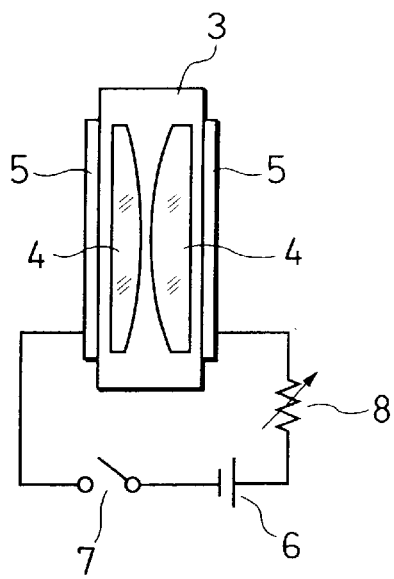
FIG. 10 is a diagram showing an example of lens whose refractive power is changed by changing a refractive index of a refractive power variable optical element.
Figure 11:
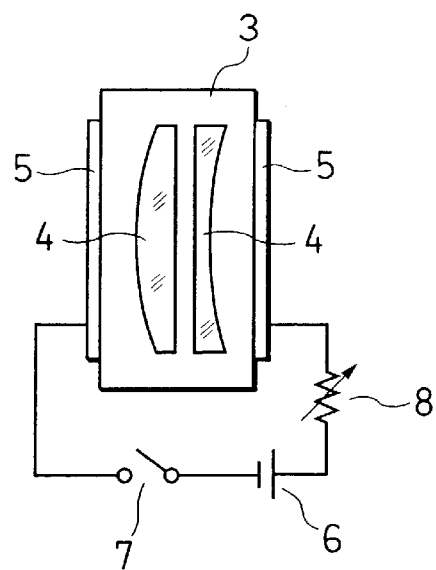
FIG. 11 is a diagram showing an example of lens whose principal point locations are changed by changing a refractive index of a refractive power variable optical element.
Figure 12:
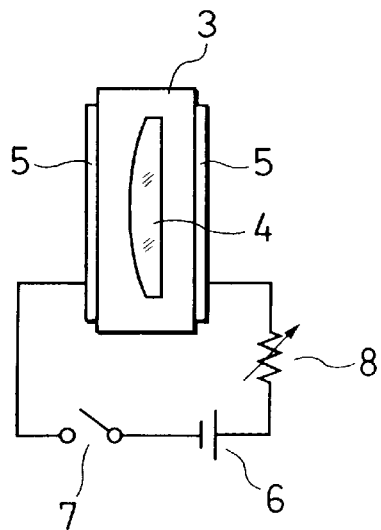
FIG. 12 is a diagram showing an example of lens whose principal points and refractive power are changed by changing a refractive index of a refractive power variable optical element.

Furthermore, FIGS. 10, 11 and 12 show examples of refractive power variable optical elements which are configured to be capable of changing both refractive power and principal point locations by changing refractive power using a material such as a liquid crystal which is capable of changing refractive power.

In these drawings, a reference numeral 3 represents a transparent optical material, reference numerals 4 designate liquid crystal cells, reference numerals 5 denote transparent electrodes, a reference numeral 6 represents a DC power source, a reference numeral 7 designates a switch and a reference numeral 8 denotes a variable resistor.

Refractive power of the optical elements such as liquid crystal cells shown in FIGS. 10, 11 and 12 is changed by applying a potential difference across the transparent electrodes 5 disposed on both surfaces of the transparent optical material 3.

The potential difference applied across the liquid crystal cells is adjusted by adjusting the variable resistor 8.

Usable as the liquid crystal cells are twist nematic liquid crystal cells, high polymeric dispersive liquid crystal cells or the like.

FIG. 10 shows an optical element having a configuration in which space portions of two piano-concave lenses having convex surfaces opposed to each other are formed in a transparent optical material 3 and a liquid crystal 4 or the like is enclosed in these spaces.

The optical element shown in FIG. 10 is capable of changing refractive power by changing refractive power of the enclosed liquid crystal without changing principal point locations.

FIG. 11 is an example where a liquid crystal or the like is enclosed in an element made of a transparent optical material in which space portions of a piano-convex lens and a plano-concave lens are formed so as to oppose planar surfaces each other.

In case of an optical element shown in this drawing, principal point locations can be changed by changing refractive power of the liquid crystal or the like without changing refractive power of the element.

Furthermore, FIG. 12 shows an example of optical element which has a space portion of a plano-convex lens is formed in a transparent optical material and a liquid crystal or the like is enclosed in this space portion.

The optical element shown in FIG. 12 is capable of changing both refractive power and principal point locations by changing refractive power of the liquid crystal or the like.

Figure 15:
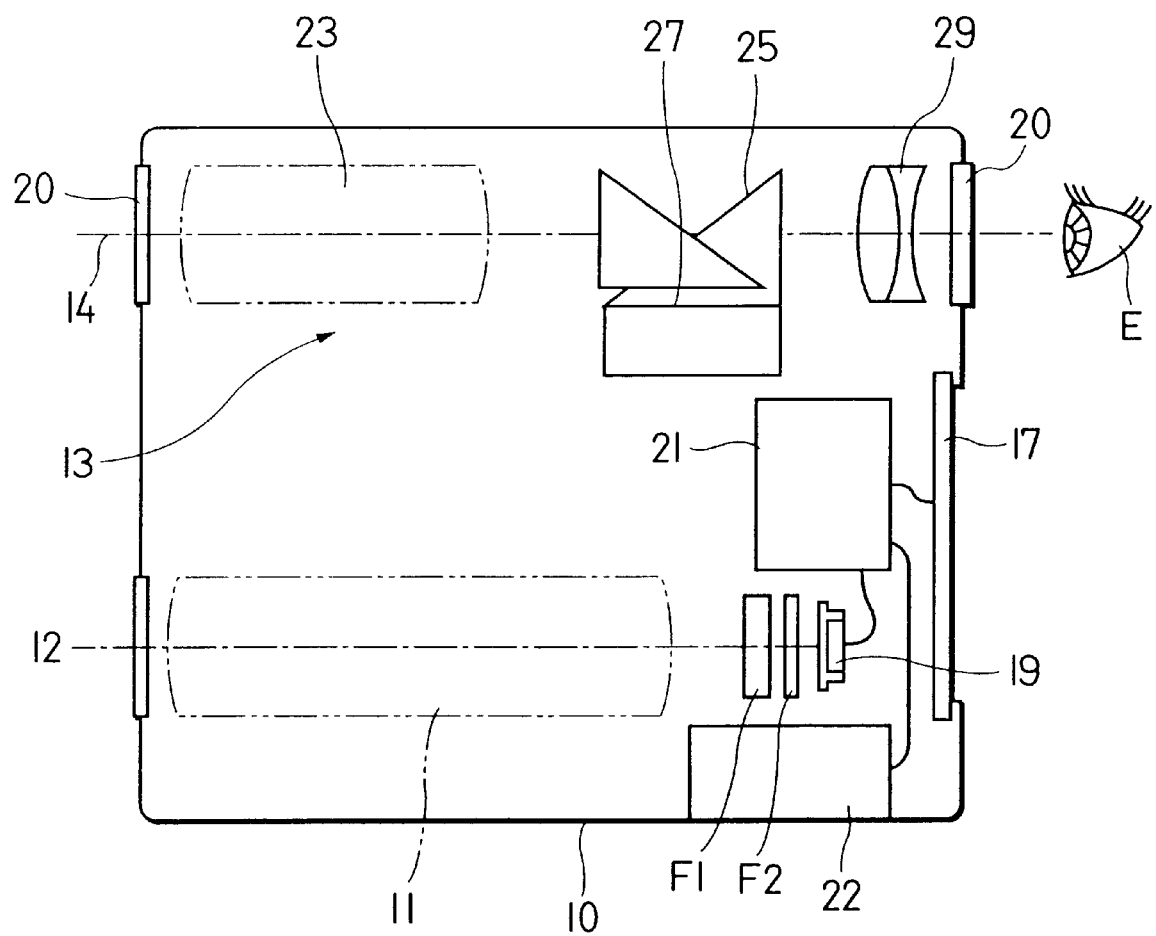
FIG. 15 is a sectional view of the above described image pickup apparatus.

FIGS. 13 through 15 show conceptional diagrams of a digital camera which is preferred as an embodiment of an image pickup apparatus according to the present invention. FIG. 13 is a front perspective view showing an appearance of a digital camera 10, FIG. 14 is a rear perspective view of the digital camera 10 and FIG. 15 is a sectional view showing a configuration of the digital camera 10. The digital camera 10 shown in the drawings comprises a photographic optical system 11 having a photographic optical path 12, an observing optical system 13 having an observing optical path 14, a shutter button 15, a flash 16, a liquid crystal display monitor 17, and when the shutter button 15 which is disposed on a top of the camera 10 is depressed, photographing is carried out through the photographic optical system 11, for example, the zoom lens system preferred as the first embodiment of the present invention shown in FIG. 1. The observing optical system 13 is used for observing a region of an object to be photographed by the photographic optical system and the photographing is carried put after confirming a photographing range with the observing optical system 13. An image of the object formed by the photographic optical system 11 is reimaged on an image pickup surface of an electronic image pickup device (CCD) 19 by way of filters F1 and F2 such as a low pass filter and an infrared cut filter. The image of the object received by the CCD 19 is displayed as an electronic image on the liquid crystal display monitor 17 disposed on a rear surface of the camera by way of processing means 21. The photographed electronic image can be recorded by recording means 22 which is connected to the processing means 21. The recording mean 22 may be disposed separately from the processing means 21 or configured to electronically record with a floppy disk, a memory card, an MO or the like. Furthermore, the CCD 19 may be replaced with a silver salt camera in which a silver salt film is disposed.

Furthermore, an objective lens system 23 of the observing optical system 18 is disposed in the observing optical path 14. The objective optical system 23 forms an image of the object on a visual field frame 27 of a Porro prism 25 adopted as an image erecting member. Disposed after the Porro prism 25 is an eyepiece optical system 29 which leads an erected image to an observer's eye B. In addition, cover members 20 are disposed on a side of incidence and a side of emergence of the photographic optical system and the observing optical system 13, that is, on a side of incidence of the objective optical system 23 and a side of emergence of the eyepiece optical system 29 respectively.

The digital camera 10 which has the configuration described above can have high performance and is inexpensive since the photographic optical system 11 is a zoom lens system which has a wide field angle, a high vari-focal ratio, favorable aberrations, high brightness and a back focal length permitting disposing filters. That is, the photographing optical system shown in FIG. 15 is the zoom lens system preferred as the first embodiment of the present invention as described above.

Though the digital camera is shown in FIGS. 13 through 15 as an example of the image pickup apparatus according to the present invention, a video camera which comprises the zoom lens system can be another example of the image pickup apparatus according to the present invention. Furthermore, the image pickup apparatus according to the present invention can be used as image input means for a data processing apparatus such as a personal computer or a communicating apparatus such as a telephone, portable telephone in particular.

The embodiment of the image pickup apparatus according to the present invention uses first embodiment of the zoom lens system according to the present invention as the photographic optical system 13 as described above. Furthermore, the other second through sixth embodiments of the zoom lens system according to the present invention can also be used.

Furthermore, the image pickup apparatus according to the present invention which has the configuration shown in FIGS. 13 through 15 may use a lens system other than the zoom lens system according to the present invention as the photographic optical system and any one of the zoom lens systems preferred as the first through sixth embodiments, for example, as the objective lens system of the observing optical system 13.

Furthermore, the image pickup apparatus according to the present invention which has the configuration shown in FIGS. 13 through 15 may use the zoom lens systems according to the present invention (zoom lens system preferred as the first through sixth embodiments of the present invention) as both the photographic optical system 11 and the objective lens system 23.

What is claimed is:

1. A zoom lens system comprising at least two lens units, wherein a magnification is changed by moving the lens units in loci different from each other, wherein each of the lens units has a refractive power variable optical element and wherein said lens unit having the refractive power variable optical element has a plurality of moving refractive surfaces.

2. A zoom lens system comprising at least two lens units, wherein a magnification is changed from a wide position to a tele position by moving the lens units in loci different from each other and wherein at least one of the lens units has a refractive power variable optical element and satisfies the following condition (1):

$$\phi V(T) < \phi V(W) \tag{1}$$

wherein reference symbols $\phi V(T)$ and $\phi V(W)$ represent an inverse number of a focal length of the lens unit having the refractive power variable optical element at said tele position and an inverse number of a focal point at said wide position respectively in a dimension of mm$^{-1}$.

3. A zoom lens system comprising at least two lens units, wherein a magnification is changed from a wide position to a tele position by moving the lens units in loci different from each other, wherein at least one lens unit has an optical element variable in a front principal point location, and wherein the zoom lens system has a lens unit on the object side of the optical element variable in the front principal point location and satisfies the following condition (2):

$$(DF(W)-DF(T))/(HF(W)-HF(T))>0 \tag{2}$$

wherein reference symbols DF(W) and DF(T) represent airspaces between the lens unit having the optical element variable in the front principal point location and the lens unit on the object side of the lens unit at said wide position and said tele position respectively, and reference symbols HF(W) and HF(T) designate front principal point locations at said wide position and said tele position respectively.

4. A zoom lens system comprising at least one focusing lens unit and at least one lens unit disposed on the image side of the focusing lens unit, wherein said focusing lens unit or the lens unit on the object side of the focusing lens unit has at least one refractive power variable optical element and wherein the zoom lens system changes magnification from a wide position to a tele position satisfying the following condition (4):

$$(\beta R(W)-\beta R(T))(\phi V(W)-\phi V(T))<0 \tag{4}$$

wherein reference symbols $\beta R(W)$ and $\beta R(T)$ represent magnifications of the lens unit on the image side of the focusing lens unit at said wide position and said tele position and the reference symbols $\phi V(W)$ and $\phi V(T)$ designate reverse numbers of focal lengths of the lens unit having the refractive power variable optical element at said wide position and said tele position respectively in a dimension of mm$^{-1}$.

5. A zoom lens system comprising at least two lens units, wherein the lens units are moved in loci different from each other to change a magnification from a wide position to a tele position, wherein at least one of the lens units has an optical element variable in a rear principal point location, and wherein the zoom lens system has another lens unit on the image side of the lens unit having said optical element and satisfies the following condition (3):

$$(DR(W)-DR(T))/(HR(W)-HR(T))<0 \tag{3}$$

wherein reference symbols DR(W) and DR(T) represent airspaces between the lens unit having the optical element variable in the rear principal point location and the lens unit on the image side of the lens unit having the optical element at the wide position and the tele position respectively, and reference symbols HR(W) and HR(T) designate the rear principal point location of the lens unit having the optical element variable in the rear principal point location at the wide position and the tele position respectively.

6. A zoom lens system comprising a plurality of lens units, wherein a magnification is changed from a wide position to a tele position by moving at least two lens units out of said plurality of lens units in loci different from each other, and wherein at least two lens units out of said plurality of lens units have optical elements which can vary at least any of front principal point locations, rear principal point locations and refractive power by changing at least either of a surface shape and a refractive index of medium.

7. A zoom lens system comprising a plurality of lens units, wherein a magnification is changed from a wide position to a tele position by moving at least two lens units out of plurality of lens units, wherein at least one lens unit out of said plurality of lens units has an optical element having positive refractive power which made weaker at said tele position than at said wide position by changing at least either of a surface shape and a refractive index of medium and wherein said optical element is disposed in a lens unit which is moved to change the magnification.

8. A zoom lens system comprising a plurality of lens units, wherein a magnification is changed from a wide position to a tele position by moving at least two lens units out of said plurality of lens units, wherein at least one lens unit out of said plurality of lens units has an optical element having negative refractive power which is made stronger at said tele position than at said wide position by changing at least either of a surface shape and a refractive index of medium and wherein said optical element is disposed in a lens unit which is moved to change the magnification.

9. A zoom lens system comprising a plurality of lens units, wherein a magnification is changed from a wide position to a tele position by moving at least two lens units out of said plurality of lens units, and wherein at least one lens unit out of said plurality of lens units has an optical element which can vary at least either of a front principal point location and a rear principal point location by changing at least either of a surface shape and a refractive index of medium.

10. The zoom lens system according to claim 6 or 9 wherein said optical element is changed by moving the lens units in loci different from each other, wherein each of the lens units has a optical power variable optical element and wherein said lens unit having the optical power variable optical element has a plurality of moving optical surfaces.

11. An image pickup apparatus comprising the zoom lens system according to claim 1, 2, 3, 4, 5, 6, 7, 8 or 9 and an image pickup device disposed on the image side of said zoom lens system.

12. An image pickup apparatus comprising an image pickup optical system and an observing optical system disposed for observing an image pickup region of an object to be photographed for image pickup by the image pickup optical system, wherein said observing optical system has another objective optical system and an eyepiece optical system, and wherein the zoom lens system according to any one of claim 1, 2, 3, 4, 5, 6, 7, 8 or 9 is used as said objective optical system.

13. An image pickup apparatus using the zoom lens system according to any one of claim 1, 2, 3, 4, 5, 6, 7, 8 or 9 as an imaging lens system.

14. A zoom lens system comprising at least two lens units, wherein a magnification is changed by moving the lens units in loci different from each other, wherein each of the lens units has a optical power variable optical element and wherein said lens unit having the optical power variable optical element has a plurality of moving optical surfaces.

15. A zoom lens system comprising at least two lens units, wherein a magnification is changed from a wide position to a tele position by moving the lens units in loci different from each other and wherein at least one of the lens units has a optical power variable optical element and satisfies the following condition (1):

$$\phi V(T) < \phi V(W) \tag{1}$$

wherein reference symbols $\phi V(T)$ and $\phi V(W)$ represent an inverse number of a focal length of the lens unit having the optical power variable optical element at said tele position and an inverse number of a focal point at said wide position respectively in a dimension of $mm^{-1}$.

16. A zoom lens system comprising at least one focusing lens unit and at least one lens unit disposed on the image side of the focusing lens unit, wherein said focusing lens unit or the lens unit on the object side of the focusing lens unit has at least one optical power variable optical element and wherein the zoom lens system changes magnification from a wide position to a tele position satisfying the following condition (4):

$$(\beta R(W) - \beta R(T))(\phi V(W) - \phi V(T)) < 0 \tag{4}$$

wherein reference symbols ($\beta R(W)$ and $\beta R(T)$ represent magnifications of the lens unit on the image side of the focusing lens unit at said wide position and said tele position and the reference symbols $\phi V(W)$ and $\phi V(T)$ designate reverse numbers of focal lengths of the lens unit having the optical power variable optical element at said wide position and said tele position respectively in a dimension of $mm^{-1}$.

17. A zoom lens system comprising a plurality of lens units, wherein a magnification is changed from a wide position to a tele position by moving at least two lens units out of said plurality of lens unit in loci different from each other, and wherein at least two lens units out of said plurality of lens units have optical elements which can vary at least any of front principal point locations, rear principal point locations and optical power by changing at least either of a surface shape and a refractive index of medium.

18. A zoom lens system comprising a plurality of lens units, wherein a magnification is changed from a wide position to a tele position by moving at least two lens units out of said plurality of lens units, wherein at least one lens unit out of said plurality of lens units has an optical element having positive optical power which is made weaker at said tele position than at said wide position by changing at least either of a surface shape and a refractive index of medium and wherein said optical element is disposed in a lens unit which is moved to change the magnification.

19. A zoom lens system comprising a plurality of lens units, wherein a magnification is changed from a wide position to a tele position by moving at least two lens units of said plurality of lens units, wherein at least one lens unit out of said plurality of lens units has an optical element having negative optical power which is made stronger at said tele position than at said wide position by changing at least either of a surface shape and refractive index of medium and wherein said optical element is disposed in a lens unit which is moved to change the magnification.

20. A zoom lens system comprising a plurality of lens units, wherein a magnification is changed from a wide position to a tele position by moving at least two lens units out of said plurality of lens units, and wherein at least one lens unit out of said plurality of lens units has an optical element having positive refractive power which is made weaker at said tele position than at said wide position by changing a refractive index of medium.

21. A zoom lens system comprising a plurality of lens units, wherein a magnification is changed from a wide position to a tele position by moving at least two lens units out of said plurality of lens units, and wherein at least one lens unit out of said plurality of lens units has an optical element having negative regfractive power which is made stronger at said tele position than at said wide position by changing a refractive index of medium.

22. A zoom lens system comprising a plurality of lens units, wherein a magnification is changed from a wide position to a tele position by moving at least two lens units out of said plurality of lens units, and wherein at least one lens unit out of said plurality of lens units has an optical element having positive optical power which is made weaker at said tele position than at said wide position by changing a refractive index of medium.

23. A zoom lens system comprising a plurality of lens units, wherein a magnification is changed from a wide position to a tele position by moving at least two lens units out of said plurality of lens units, and wherein at least one lens unit out of said plurality of lens units has an optical element having negative optical power which is made stronger at said tele position than at said wide position by changing a refractive index of medium.

24. The zoom lens system according to claim 2, 3, 4, 5, 15, 16, 17, 18, 19, 20, 21, 22 or 23, wherein said optical element is disposed in a lens unit which is moved to change the magnification.

* * * * *